Oct. 10, 1933.  A. C. VAN HOOYDONK  1,930,292
BREAD SLICING MACHINE
Filed Feb. 15, 1930  2 Sheets-Sheet 1
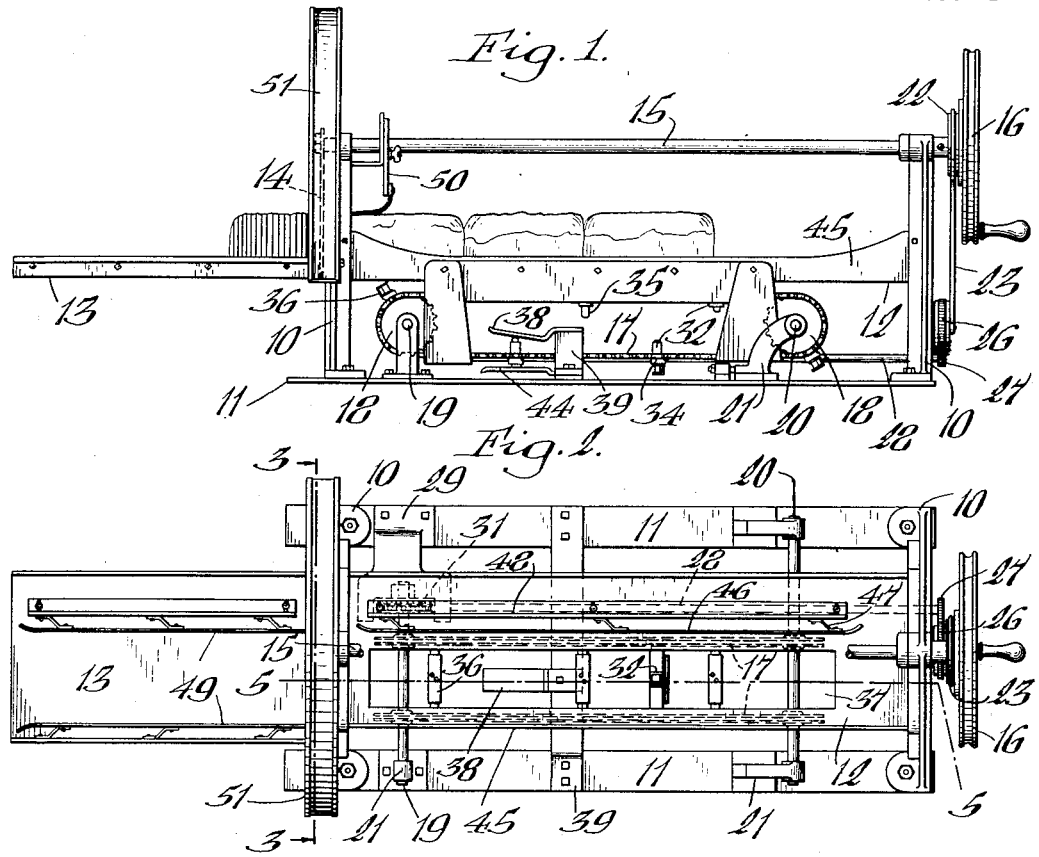
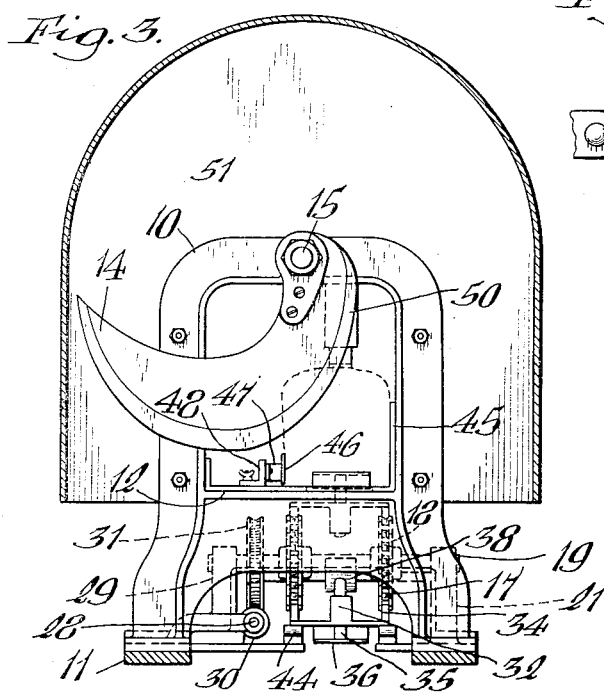
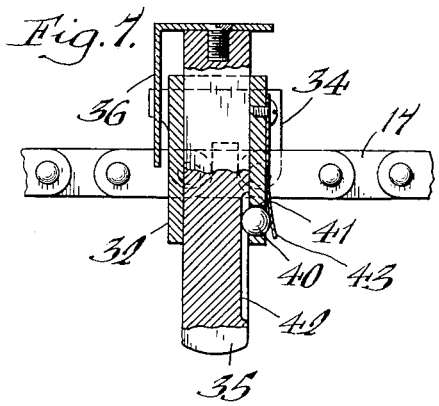
Inventor,
Adrian C. Van Hooydonk,
by Walter P. Geyer
Attorney.

Oct. 10, 1933.   A. C. VAN HOOYDONK   1,930,292
BREAD SLICING MACHINE
Filed Feb. 15, 1930   2 Sheets-Sheet 2

Inventor,
Adrian C. Van Hooydonk,
by Walter P. Geyer
Attorney.

UNITED STATES PATENT OFFICE 1,930,292

BREAD SLICING MACHINE

Adrian C. Van Hooydonk, Buffalo, N. Y., assignor to John E. Smith's Sons Company, Buffalo, N. Y., a corporation of New York Application February 15, 1930. Serial No. 428,553

2 Claims. (Cl. 198—168)

This invention relates to improvements in slicing machines and more particularly to a machine for slicing bread.

One of its objects is the provision of a machine of this character which has been so designed as to expeditiously effect the slicing of bread-loaves, which is positive and efficient in operation, and which is not liable to get out of order.

Another object of the invention is to provide a bread-slicing machine which is simple, compact and inexpensive in construction, and which has novel means for successively feeding the loaves past the cutting mechanism.

In the accompanying drawings:—

Figure 4:
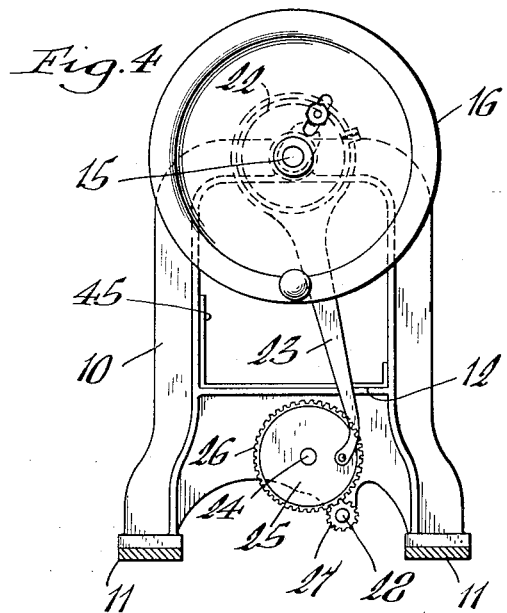
Figure 5:
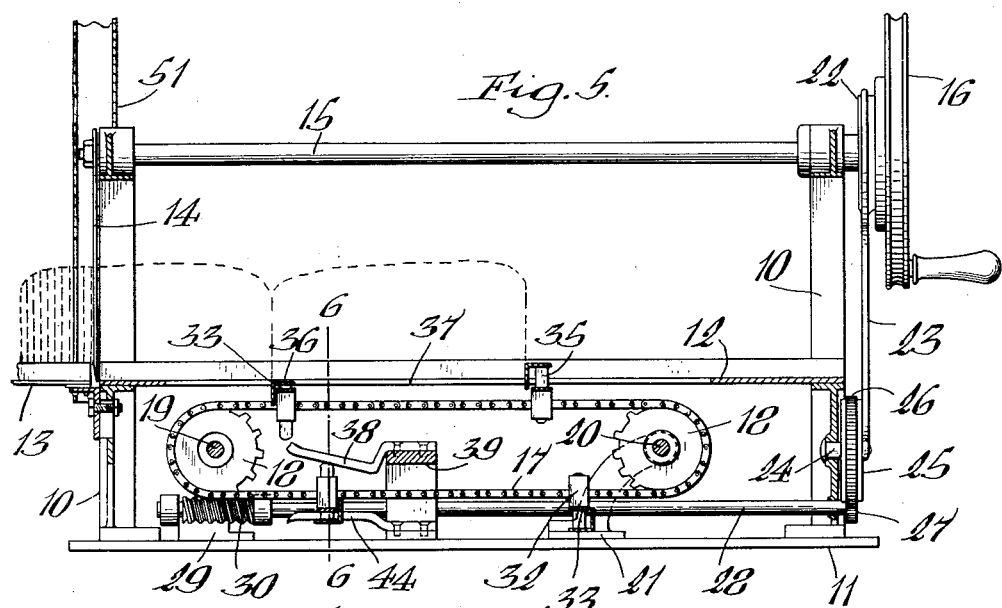
Figure 6:
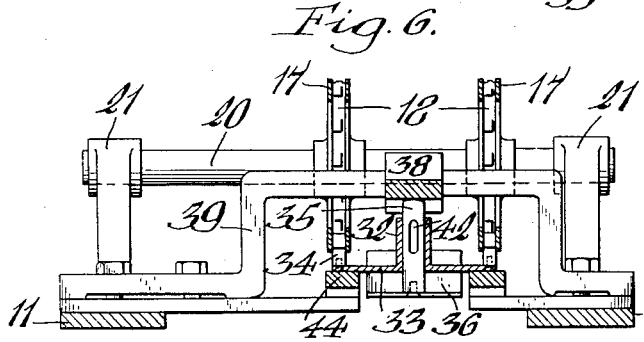

Figure 1 is a side elevation of the improved slicing machine. Figure 2 is a top plan view thereof. Figure 3 is an enlarged cross section taken in the plane of line 3—3, Figure 2. Figure 4 is a rear end view of the machine. Figure 5 is an enlarged longitudinal section thereof taken on line 5—5, Figure 2. Figure 6 is an enlarged cross section taken on line 6—6, Figure 5. Figure 7 is an enlarged cross section of one of the feed wings on the conveyor.

Similar characters of reference indicate corresponding parts throughout the several views.

The working parts of the machine are mounted on a suitable frame of any suitable and appropriate construction, that shown in the drawings consisting of a pair of uprights or standards 10, 10 arranged in longitudinally spaced relation and tied at their ends by longitudinal base plates or bars 11, 11. Supported at its ends intermediately the upper and lower ends of the standards is a longitudinally disposed horizontal table or platform 12 having an extension 13 projecting forwardly beyond the front standard and on which platforms the bread is adapted to travel during and after the slicing or cutting operation.

During the slicing operation, the loaves of bread are successively fed past a revolving cutter or knife 14 mounted at the front end of a horizontal drive shaft 15 journaled in the upper ends of the standards 10. This shaft may be driven by hand from a hand-wheel 16 applied to its rear end, or it may be driven by an electric motor or other source of power. Operatively connected with the cutter-shaft 15 is a conveying mechanism which is designed to intermittently feed the loaves of bread a predetermined distance, depending on the thickness of the slice desired, after the cutter has made a cut and before it is ready to make the next cut. This conveying mechanism is preferably constructed as follows:—

Disposed below the platform 12 in parallel relation thereto is a pair of laterally spaced conveyor belts or chains 17 which pass at their ends around sprocket wheels 18 fixed on front and rear transverse shafts 19 and 20, respectively, journaled in suitable bearing brackets 21 secured to the base plates 11 of the machine-frame. Intermittent motion is transmitted to these conveyor belts from the drive shaft 15 by an eccentric 22 mounted thereon and connected by a pitman or connecting rod 23 with a ratchet feed mechanism journaled on an arbor 24 fastened to the rear standard 10 and indicated generally by the numeral 25 and including a gear 26 meshing with a pinion 27 mounted at the rear end of a driven shaft 28 journaled at its rear end in the corresponding standard 10 and at its front end in a suitable bearing bracket 29. As shown in Figures 3 and 5, said shaft 28 is disposed below the lower stretches of the conveyor belts 17 and is provided at its front end with a worm 30 meshing with a worm wheel 31 mounted on the front sprocket-shaft 19. By this construction, for every revolution of the driving shaft 15, the conveyor belts, through the medium of the eccentric and ratchet feed, are advanced in a forward direction a distance equal to that of the width of cut desired. The width of the cut may be varied accordingly by adjusting the eccentric 22 radially of its shaft in any well known manner.

Applied to the conveyor belts are a plurality of feed wings or flights for engaging the rear ends of the bread-loaves to feed them forwardly over the platform or table 12 across the path of travel of the revolving knife 14. Each of these flights, by preference, consists of an upright tubular body portion holder 32 having attaching flanges 33 projecting laterally from its lower ends and secured to link members 34 inserted in the conveyor chains 17, in the manner shown in Figure 6. Guided for vertical movement in the tubular portion 32, which may be rectangular in cross-section, is a plunger 35 provided at its upper end with a feed-wing 36, the latter being preferably L-shaped in cross-section with the upright bread-engaging face extending transversely between the feed belts. As shown in Figure 5, the platform 12 has a longitudinal slot or opening 37 through which the feed-wings are adapted to extend when they assume a position along the upper stretches of the belts. The purpose of making the feed-wings 36 vertically movable is to make it possible to place more than one loaf of bread in the machine in contiguous relation one behind the other, it being possible to automatically effect the depression of the front flight or flights by the loaves of bread placed thereover, while the rearmost flight remains elevated to push the several loaves of bread as a unit toward the cutter. The depression of a flight may be effected manually or, as in practise, by merely placing a loaf of bread over the same, the bread forcing the flight-plunger downwardly to a point at or below the surface of the table 12. For this purpose and to insure the placing of the bread in proper position on the conveyor, the distance between the bearing faces of adjoining feed-wings is equal to the length of a loaf of bread.

Means are provided for automatically elevating a depressed flight, so that when the same travels around to the upper stretches of the conveyor-belts it is in operative position to engage the last loaf of bread in the line to be cut or sliced. This means consists of a cam or deflector bar 38 attached to a supporting bracket 39 and disposed between the upper and lower stretches of the conveyor belts and in the path of movement of the projecting ends of the flight-plungers 35, as seen in Figure 5. This deflector is sloped rearwardly so that as the plunger contacts therewith it forces the plunger downwardly to bring its flight 36 in the proper elevated position for contact with the bread-loaves. Any suitable means may be employed for holding the plunger in its elevated position, that shown in the drawings, particularly Figure 7, shows a friction type of holding means consisting of a ball 40 seated in an opening 41 in one of the walls of the tubular partion 32 of the flight and bearing at its inner side in an upright groove or depression 42 in the opposing side of the flight-plunger 35. A spring 43 bearing against the outer side of the ball constantly urges the same into frictional engagement with the plunger, this friction being sufficient to normally hold the flight in its elevated position, and yet permit the flight to be lowered easily when a loaf of bread is placed over it. The ends of the groove 42 constitute stops for limiting the movement of the flight-plunger in either direction. Disposed below the deflector bar 38 and in substantially vertical alinement with the conveyor chains 17 is a pair of supporting bars 44 which act as rests for the lateral flanges 33 of the flights and thus support the tubular portions thereof during the depression of the plungers by the deflector bar.

In order to guide the bread longitudinally over the table and properly hold it during the slicing thereof, the table or platform 12 is provided at one of its longitudinal edges with an upright flange 45 against which one side of the bread loaves are adapted to engage, while the opposite sides thereof are engaged by a yieldable guide plate 46 joined by flat springs 47 to a laterally adjustable rail 48 mounted on the platform. Applied to the platform-extension 13 in alinement with the bread-guides 45, 46 are laterally yieldable bearing plates 49 which bear against opposite sides of the sliced loaves of bread as they pass the cutter 14 and serve to hold the slices together preparatory to removing the sliced loaves from the machine for wrapping purposes.

If desired, a yieldable gripping bar 50 may be employed for engaging the top side of the loaf being sliced to assist in firmly holding the loaf to the table.

A guard 51 is preferably placed over the revolving knife 14 to protect the attendants and prevent their hands coming into the path of travel knife.

I claim as my invenion:—

1. In a machine of the character described, a table having an opening therein, an endless belt disposed below the same, feed-wings applied to said belt and projectable above the surface of the table for engaging an article to be fed over the table and depressable below the same to an inoperative position, each of said wings including a body attached to the belt, an article-engaging member guided thereon for vertical movement into and out of feeding position, means for releasably holding said member in either position, and means for automatically moving the article-engaging members of said feed-wings from a depressed inoperative position to an elevated operative position above the table at a predetermined point in their path of travel with the conveyor, said feed wings being depressable by contact of the leading end of the article to be fed as it is placed on the platform, the trailing end of the article being engaged by the following projected feed wing for propelling it over the platform.

2. In a machine of the character described, an endless conveyor consisting of laterally spaced belts, feed wings applied thereto for engaging an article to be fed, each of said wings including a tubular body having lateral attaching flanges secured to said belts and a plunger guided for movement in said tubular body and having an article-engaging member applied to one end thereof in overlying relation to said body, means arranged in the path of movement of a depressed plunger for elevating it to an operative position, and means disposed in alinement with the conveyor belts for supporting the lateral body-flanges during the movement of the plunger to its projected operative position.

ADRIAN C. VAN HOOYDONK.